(12) United States Patent
Byrd et al.

(10) Patent No.: US 10,617,144 B2
(45) Date of Patent: *Apr. 14, 2020

(54) MOLECULARLY IMPRINTED POLYMERS FOR TREATING TOBACCO MATERIAL AND FILTERING SMOKE FROM SMOKING ARTICLES

(71) Applicant: R.J. Reynolds Tobacco Company, Winston-Salem, NC (US)

(72) Inventors: Crystal Dawn Hege Byrd, Lexington, NC (US); Anthony Richard Gerardi, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/924,394

(22) Filed: Oct. 27, 2015

(65) Prior Publication Data
US 2016/0044957 A1    Feb. 18, 2016

Related U.S. Application Data

(63) Continuation of application No. 13/111,330, filed on May 19, 2011, now Pat. No. 9,192,193.

(51) Int. Cl.
*A24B 15/24*  (2006.01)
*A24B 15/30*  (2006.01)
(Continued)

(52) U.S. Cl.
CPC .......... *A24B 15/241* (2013.01); *A24B 15/246* (2013.01); *A24B 15/30* (2013.01);
(Continued)

(58) Field of Classification Search
USPC ........... 526/208, 210, 2, 13, 216, 21, 7, 258, 526/303.1, 307.3–307.7, 310, 312, 89,
(Continued)

(56) References Cited

U.S. PATENT DOCUMENTS 4,127,730 A  11/1978  Wulff et al.
5,110,883 A   5/1992  Gartner
(Continued)

FOREIGN PATENT DOCUMENTS

CN  1088763    7/1994
DE  2631670    1/1978
(Continued)

OTHER PUBLICATIONS

Ashwood-Smith, M.J. et al. "Lack of Mutagenicity and Putative Carcinogenicity of Several Novel Benzopyrene Derivatives" Mutation Research 1978 vol. 57 No. 2 pp. 123-125.
(Continued)

*Primary Examiner* — Dennis R Cordray
(74) *Attorney, Agent, or Firm* — Womble Bond Dickinson (US) LLP

(57) ABSTRACT

The invention provides a method of isolating certain target compounds from tobacco, tobacco materials or smoke generated by a smoking article. The method can be used to remove undesirable compounds from tobacco, tobacco materials, or tobacco smoke. The method can also be used to remove flavor compounds from tobacco or tobacco materials, which can then be used as flavor components for tobacco material used in smoking articles and smokeless tobacco compositions.

1 Claim, 2 Drawing Sheets

(51) Int. Cl.
  *C08F 220/20* (2006.01)
  *A24D 3/14* (2006.01)
  *A24D 3/08* (2006.01)
  *C08F 20/06* (2006.01)

(52) U.S. Cl.
  CPC ............... *A24D 3/08* (2013.01); *A24D 3/14* (2013.01); *C08F 20/06* (2013.01); *C08F 220/20* (2013.01)

(58) Field of Classification Search
  USPC .. 526/317.1, 90, 318.5, 319, 328, 72, 328.5, 526/329.7, 343–347.1; 131/290, 332, 131/297, 334
  See application file for complete search history.

(56) References Cited

U.S. PATENT DOCUMENTS

| | | | |
|---|---|---|---|
| 5,630,978 | A | 5/1997 | Domb |
| 6,481,442 | B1 | 11/2002 | Dyakonov et al. |
| 6,679,270 | B2 | 1/2004 | Baskevitch et al. |
| 6,759,488 | B1 | 7/2004 | Sellergren et al. |
| 6,866,045 | B1 | 3/2005 | Maillard et al. |
| 7,229,836 | B2 | 6/2007 | Petcu et al. |
| 7,332,553 | B2 | 2/2008 | Sellergren et al. |
| 7,337,782 | B2 | 3/2008 | Thompson |
| 7,393,909 | B2 | 7/2008 | Sellergren et al. |
| 8,807,142 | B2 | 8/2014 | Bhattacharyya et al. |
| 9,192,193 | B2 * | 11/2015 | Byrd .................... A24B 15/241 |
| 2003/0172944 | A1 | 9/2003 | Hsu |
| 2004/0040565 | A1 | 3/2004 | Xue et al. |
| 2004/0157209 | A1 | 8/2004 | Yilmaz et al. |
| 2007/0090058 | A1* | 4/2007 | Southard .................. B01J 20/26 210/727 |
| 2007/0186940 | A1 | 8/2007 | Bhattacharyya et al. |
| 2007/0295345 | A1 | 12/2007 | Caraway, Jr. et al. |
| 2008/0038832 | A1 | 2/2008 | Sellergren et al. |
| 2008/0135058 | A1 | 6/2008 | Germroth et al. |
| 2008/0135059 | A1 | 6/2008 | Germroth et al. |
| 2008/0135060 | A1 | 6/2008 | Kuo et al. |
| 2008/0214405 | A1 | 9/2008 | Chen et al. |
| 2008/0245376 | A1 | 10/2008 | Travers et al. |
| 2010/0113724 | A1 | 5/2010 | Yilmaz et al. |
| 2010/0239726 | A1 | 9/2010 | Pertsovich |
| 2011/0041859 | A1 | 2/2011 | Rees et al. |
| 2011/0083683 | A1 | 4/2011 | Krauss |
| 2011/0159160 | A1 | 6/2011 | Jonsson et al. |
| 2012/0125354 | A1 | 5/2012 | Byrd et al. |

FOREIGN PATENT DOCUMENTS

| | | |
|---|---|---|
| EP | 925776 A2 * | 6/1996 |
| EP | 2138214 | 12/2009 |
| JP | H11240916 | 9/1999 |
| JP | 2008189586 | 8/2008 |
| WO | WO-2007/012980 | 1/2007 |
| WO | WO-2008/068153 | 6/2008 |
| WO | WO-2009-156763 | 12/2009 |

OTHER PUBLICATIONS

Cormack, et al. "Molecularly Imprinted Polymers: Synthesis and Characterisation" Journal of Chromatography B. 2004 pp. 173-182.
Liu, et al. "Molecularly Imprinted Solid-Phase Extraction Sorbent for Removal of Nicotine from Tobacco Smoke" Analytical Letters 2003, vol. 36, No. 8 pp. 1631-1645.
Takeuchi, et al. "Combinatorial Molecular Imprinting: An Approach to Synthetic Polymer Receptors" Analytical Chemistry 1999, vol. 71, No. 2 pp. 285-290.
Turner, et al. "From 3D to 2D: A Review of the Molecular Imprinting of Proteins" National Institutes of Health, 2006, vol. 22, No. 6, pp. 1474-1489.
Yan, et al. "Characteristic and Synthetic Approach of Molecularly Imprinted Polymer" International Journal of Molecular Sciences 2006, vol. 7, pp. 155-178.

* cited by examiner

MOLECULARLY IMPRINTED POLYMERS FOR TREATING TOBACCO MATERIAL AND FILTERING SMOKE FROM SMOKING ARTICLES

CROSS-REFERENCE TO RELATED APPLICATIONS

The present application is a continuation of U.S. application Ser. No. 13/111,330, which is incorporated herein by reference in its entirety.

FIELD OF THE INVENTION

The present invention relates to products made or derived from tobacco, or that otherwise incorporate tobacco, and are intended for human consumption. Of particular interest are ingredients or components obtained or derived from plants or portions of plants from the *Nicotiana* species.

BACKGROUND OF THE INVENTION

Popular smoking articles, such as cigarettes, have a substantially cylindrical rod shaped structure and include a charge, roll or column of smokable material such as shredded tobacco (e.g., in cut filler form) surrounded by a paper wrapper thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, $3^{rd}$ Ed., p. 43 (1990) and *Tobacco Production, Chemistry and Technology*, Davis et al. (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; and 2010/0291245 to Gao et al; PCT WO 04/095959 to Arnarp et al. and WO 2010/132444 A2 to Atchley; and U.S. patent application Ser. No. 12/638,394, filed Dec. 15, 2009, to Mua et al.; each of which is incorporated herein by reference.

Through the years, various treatment methods and additives have been proposed for altering the overall character or nature of tobacco materials utilized in tobacco products. For example, additives or treatment processes have been utilized in order to alter the chemistry or sensory properties of the tobacco material, or in the case of smokable tobacco materials, to alter the chemistry or sensory properties of mainstream smoke generated by smoking articles including the tobacco material. The sensory attributes of cigarette smoke can be enhanced by incorporating flavoring materials into various components of a cigarette. Exemplary flavoring additives include menthol and products of Maillard reactions, such as pyrazines, aminosugars, and Amadori compounds. American cigarette tobacco blends typically contain a casing composition that includes flavoring ingredients, such as licorice or cocoa powder and a sugar source such as high fructose corn syrup. See also, Leffingwell et al., *Tobacco Flavoring for Smoking Products*, R.J. Reynolds Tobacco Company (1972), which is incorporated herein by reference. Various processes for preparing flavorful and aromatic compositions for use in tobacco compositions are set forth in U.S. Pat. No. 3,424,171 to Rooker; U.S. Pat. No. 3,476,118 to Luttich; U.S. Pat. No. 4,150,677 to Osborne, Jr. et al.; U.S. Pat. No. 4,986,286 to Roberts et al.; U.S. Pat. No. 5,074,319 to White et al.; U.S. Pat. No. 5,099,862 to White et al.; U.S. Pat. No. 5,235,992 to Sensabaugh, Jr.; U.S. Pat. No. 5,301,694 to Raymond et al.; U.S. Pat. No. 6,298,858 to Coleman, III et al.; U.S. Pat. No. 6,325,860 to Coleman, III et al.; U.S. Pat. No. 6,428,624 to Coleman, III et al.; U.S. Pat. No. 6,440,223 to Dube et al.; U.S. Pat. No. 6,499,489 to Coleman, III; and U.S. Pat. No. 6,591,841 to White et al.; US Pat. Appl. Pub. Nos. 2004/0173228 to Coleman, III and 2010/0037903 to Coleman, III et al., each of which is incorporated herein by reference.

The sensory attributes of smokeless tobacco can also be enhanced by incorporation of certain flavoring materials. See, for example, U.S. Pat. No. 6,668,839 to Williams; U.S. Pat. No. 6,834,654 to Williams; U.S. Pat. No. 7,032,601 to Atchley et al.; U.S. Pat. No. 7,694,686 to Breslin et al.; U.S. Pat. No. 7,810,507 to Dube et al; U.S. Pat. No. 7,819,124 to Strickland et al; and U.S. Pat. No. 7,861,728 to Holton, Jr. et al.; US Pat. Appl. Pub. Nos. 2004/0020503 to Williams; 2006/0191548 to Strickland et al.; 2007/0062549 to Holton, Jr. et al.; 2008/0029116 to Robinson et al.; 2008/0173317 to Robinson et al.; and 2008/0209586 to Neilsen et al., each of which is incorporated herein by reference.

It would be desirable to provide additional compositions and methods for altering the character and nature of tobacco (and tobacco compositions and formulations) useful in the manufacture of smoking articles and/or smokeless tobacco products. For example, it would be desirable to develop compositions and methods for altering the character and nature of tobacco compositions and formulations by isolating and removing certain undesirable components therefrom. Further, it would be desirable to isolate certain desirable components (e.g., flavor compounds) from tobacco that may be added back into tobacco compositions and formulations to impart desirable characteristics thereto.

SUMMARY OF THE INVENTION

The present invention provides a method of extracting and isolating various compounds from plants of the *Nicotiana* species. In certain embodiments, the method of the invention is selective for certain compounds that are advantageously isolated and removed from tobacco. In certain embodiments, the method of the invention is selective for certain compounds that are advantageously isolated and concentrated (e.g., organoleptic compounds that are known to impart flavor, texture, and/or aroma to smoking articles and smokeless tobacco products).

In certain aspects of the invention, a molecularly imprinted polymer is provided, which is selective for: (a) a Hoffmann analyte selected from the group consisting of 1-aminonapthalene, 2-aminonapthalene, 3-aminobiphenyl, 4-aminobiphenyl, methyl ethyl ketone, acetaldehyde, acetone, acrolein, butyraldehyde, crotonaldehyde, formaldehyde, priopionaldehyde, catechol, hydroquinone, m-cresol, p-cresol, o-cresol, phenol, resorcinol, ammonia, hydrogen cyanide, nitric oxide, carbon monoxide, acrylonitrile, 1,3-butadiene, benzene, isoprene, toluene, styrene, pyridine, quinoline, arsenic, cadmium, chromium, lead, mercury, nickel, selenium, or precursor thereto; or (b) an organoleptic compound found naturally in one or more *Nicotiana* species. Exemplary organoleptic compounds include megastigmatrienones, β-damascenone, sclareolide, solanone, methyl salicylate, cinammic aldehyde, phenethyl alcohol, benzyl alcohol, methyl chavicol, geranyl acetone, 4-ketoisophorone, benzaldehyde, isophorone, eugenol, methoxy eugenol, heptanol, methyloctanoate, 2-methylpropionic acid, 2-methylbutyric acid, 4-methylpentanoic acid, hexanoic acid, hexadecanoic acid, octadecanoic acid, linalool, phenethyl alcohol, docecylacylate, nerolidol, octanoic acid, oleic acid, linolenic acid, 5-acetoxymethyl-2-furfural, farnesal, 1-hexadecane, 1-octadecene, phytol, vanillin, acetovanillin, cinnamaldehyde, cinnamyl alcohol, methylbenzoate, salicylaldehyde, benzylsalicylate, cembrenediols, isophorone, oximes, solavetivone, thunbergol, docecylacrylate, cembrenol, benylbenzoate, scaral, acetophenone, caryophyllene, and aristolone.

The molecularly imprinted polymer can comprise any type of polymer or copolymer and in some embodiments, the molecularly imprinted polymer comprises a polymer prepared from one or more monomers selected from the group consisting of vinyl-containing monomers, acrylic acid or acrylate-containing monomers, acrylamide-containing monomers, and derivatives thereof. Particular monomers useful according to the invention include, but are not limited to, vinyl chloride, vinyl fluoride, vinylidene fluoride, methyl vinyl ether, perfluoro(methyl vinyl ether), chloroprene, isoprene, vinyl acetate, ethylene, acrylic acid, methacrylic acid, trifluoromethacrylic acid, methyl methacrylic acid, methyl methacrylate, ethylene glycol dimethacrylate, hydroxyethylmethacrylate, trans-3-(3-pyridyl)-acrylic acid, styrene, 4-ethyl styrene, p-vinyl benzoic acid, 4-vinylpyridine, 4-vinylbenzyl-trimethyl ammionium chloride, 4(5)-vinyl imidazole, styrene, acrylamide, vinylpyrrolidone, acrylonitrile, 4-vinyl benzamidine, 2-vinylpyridine, 1-vinylimidazole, acrylamide, methacrylamide, acrylamido-(2-methyl)-1-propane sulfonic acid, itaconic acid, and combinations thereof.

In another aspect of the invention is provided a smoking article comprising a tobacco rod circumscribed by a wrapping material attached to an adjacent filter element circumscribed by a plug wrap, wherein the smoking article further comprises a molecularly imprinted polymer selective for a Hoffmann analyte selected from the group consisting of 1-aminonapthalene, 2-aminonapthalene, 3-aminobiphenyl, 4-aminobiphenyl, methyl ethyl ketone, acetaldehyde, acetone, acrolein, benzo[a]pyrene, butyraldehyde, crotonaldehyde, formaldehyde, priopionaldehyde, catechol, hydroquinone, m-cresol, p-cresol, o-cresol, phenol, resorcinol, ammonia, hydrogen cyanide, nitric oxide, carbon monoxide, acrylonitrile, 1,3-butadiene, benzene, isoprene, toluene, styrene, pyridine, quinoline, arsenic, cadmium, chromium, lead, mercury, nickel, selenium, and precursors thereof. In some particular embodiments, the molecularly imprinted polymer is selective for benzo[a]pyrene. The molecularly imprinted polymer can be incorporated within various portions of the smoking article. For example, the molecularly imprinted polymer can be contained within the filter element of the smoking article.

In a further aspect of the present invention, a method is provided for preparing a molecularly imprinted polymer selective for a Hoffman analyte or an organoleptic compound found naturally in one or more *Nicotiana* species, the method comprising:

(a) selecting a template molecule suitable for forming a molecularly imprinted polymer selective for a target molecule selected from (i) a Hoffmann analyte selected from the group consisting of 1-aminonapthalene, 2-aminonapthalene, 3-aminobiphenyl, 4-aminobiphenyl, methyl ethyl ketone, acetaldehyde, acetone, acrolein, butyraldehyde, crotonaldehyde, formaldehyde, priopionaldehyde, catechol, hydroquinone, m-cresol, p-cresol, o-cresol, phenol, resorcinol, ammonia, hydrogen cyanide, nitric oxide, carbon monoxide, acrylonitrile, 1,3-butadiene, benzene, isoprene, toluene, styrene, pyridine, quinoline, arsenic, cadmium, chromium, lead, mercury, nickel, selenium, or precursor thereto; or (ii) an organoleptic compound found naturally in one or more *Nicotiana* species, wherein the template molecule is the target molecule or a structural analogue thereof; and (b) polymerizing at least one functional monomer in the presence of the selected template molecule to produce a molecularly imprinted polymer selective for the target molecule.

The target compounds according to this method may vary, and in some embodiments, are selected from the list of organoleptic compounds provided above. Similarly, the monomers used to prepare the molecularly imprinted polymers may vary and can, for example, comprise the monomers noted above.

In an additional aspect of the present invention, a method of isolating a target compound from tobacco material is provided, comprising: contacting a tobacco material with a molecularly imprinted polymer specific for a target compound contained within the tobacco material for a time and under conditions sufficient to bind the target compound within the molecularly imprinted polymer, wherein the target compound is (a) a Hoffmann analyte selected from the group consisting of 1-aminonapthalene, 2-aminonapthalene, 3-aminobiphenyl, 4-aminobiphenyl, methyl ethyl ketone, acetaldehyde, acetone, acrolein, butyraldehyde, crotonaldehyde, formaldehyde, priopionaldehyde, catechol, hydroquinone, m-cresol, p-cresol, o-cresol, phenol, resorcinol, ammonia, hydrogen cyanide, nitric oxide, carbon monoxide, acrylonitrile, 1,3-butadiene, benzene, isoprene, toluene, styrene, pyridine, quinoline, arsenic, cadmium, chromium, lead, mercury, nickel, selenium, or precursor thereto; or (b) an organoleptic compound found naturally in one or more *Nicotiana* species.

The tobacco material can vary, and may be, for example, a tobacco extract or tobacco slurry, and wherein the method further comprises separating the treated tobacco material from the molecularly imprinted polymer to afford a treated material having reduced content of the target compound. In some embodiments, the tobacco extract or tobacco slurry comprises a solvent selected from the group consisting of water, methylene chloride, methanol, hexanes, and ethyl acetate. The tobacco material can, in certain embodiments, comprise vapor phase components from the headspace surrounding a living flower of a plant of a *Nicotiana* species. The tobacco material can be provided in green form or cured form.

In certain embodiments, the target compound is a Hoffmann analyte precursor. For example, the target compound may be, but is not limited to, benzo[a]pyrene (BaP), formaldehyde, N'-nitrosonornicotine, 4-(methylnitrosoamino)-1-(3-pyridyl)-1-butanone, cyanide, benzene, lead, arsenic, nickel compounds, polonium-210, uranium-235, uranium-238, beryllium, cadmium, chromium, mixtures thereof, or derivatives thereof. According to this method, the content of target compound in the treated tobacco material is typically reduced to some extent as compared to the untreated tobacco material. For example, the content of target compound can be reduced by greater than about 50%, greater than about 80%, or greater than about 90% as compared to the untreated tobacco material. In some embodiments, the target compound is an organoleptic compound, and the molecularly imprinted polymer with target compound bound thereto is added to a tobacco composition adapted for use in a smokeless tobacco product.

In some embodiments, the molecularly imprinted polymer is regenerated by washing the molecularly imprinted polymer with a solvent for a time and under conditions sufficient to remove the target compound from the molecularly imprinted polymer. According to certain embodiments, the target compound removed from the molecularly imprinted polymer is an organoleptic compound, and the target compound removed from the molecularly imprinted polymer is added to a tobacco composition. The tobacco composition can vary, and may be, for example, adapted for use as a smokable material in a smoking article or adapted for use in a smokeless tobacco product. The solvent containing the target compound typically comprises predominantly solvent and the target compound, for example, the solvent containing the target compound can comprise at least about 80%, at least about 90%, or at least about 95% target compound and solvent by weight.

BRIEF DESCRIPTION OF THE DRAWINGS

In order to assist the understanding of embodiments of the invention, reference will now be made to the appended drawings, in which like reference numerals refer to like elements and which are not necessarily drawn to scale. The drawings are exemplary only, and should not be construed as limiting the invention.

DETAILED DESCRIPTION OF THE PREFERRED EMBODIMENTS

Figure 1:
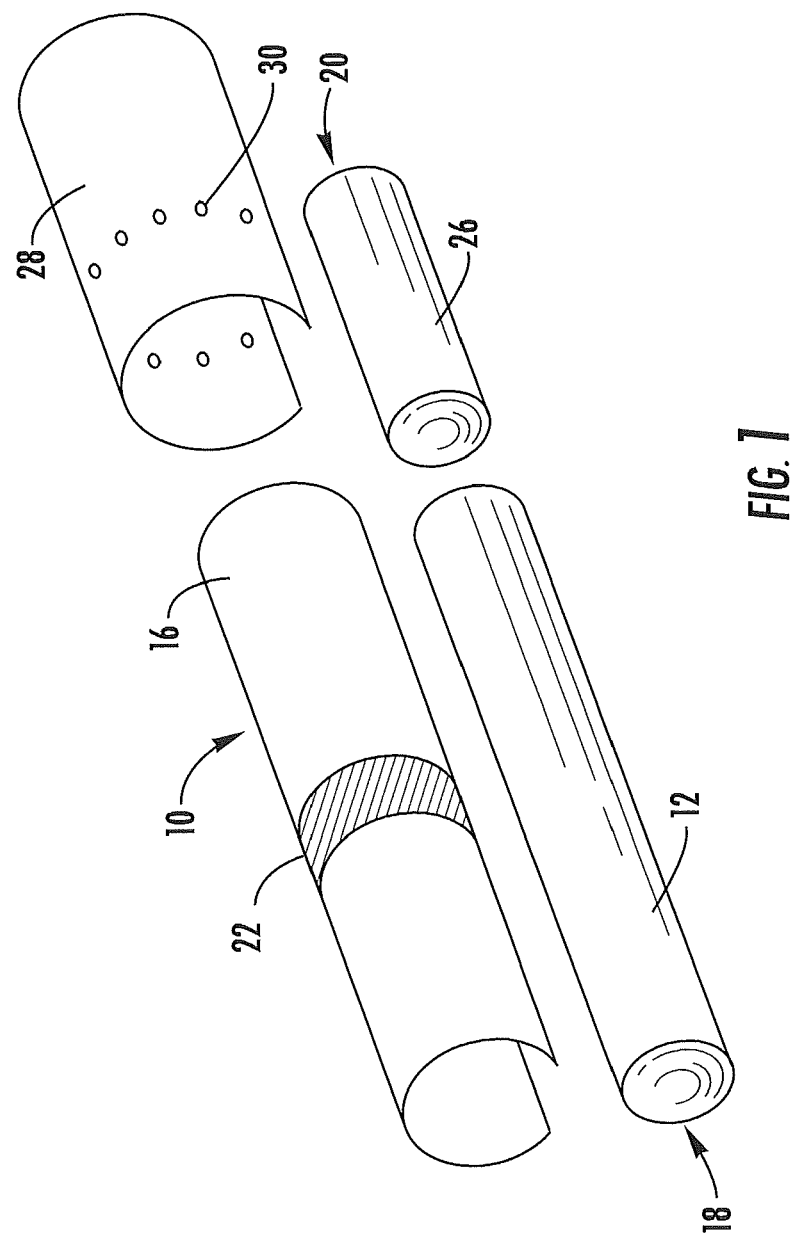
FIG. 1 is an exploded perspective view of a smoking article having the form of a cigarette, showing the smokable material, the wrapping material components, and the filter element of the cigarette.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The selection of the plant from the *Nicotiana* species utilized in the process of the invention can vary; and in particular, the types of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al.; U.S. Pat. No. 7,025,066 to Lawson et al.; and U.S. Pat. No. 7,798,153 to Lawrence, Jr.; and US Patent Appl. Pub. No. 2008/0245377 to Marshall et al.; each of which is incorporated herein by reference.

Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia* and *N. spegazzinii*.

*Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and 2008/0209586 to Nielsen et al., which are all incorporated herein by reference.

For the preparation of smokeless and smokable tobacco products, it is typical for harvested plants of the *Nicotiana* species to be subjected to a curing process. Descriptions of various types of curing processes for various types of tobaccos are set forth in *Tobacco Production, Chemistry and Technology*, Davis et al. (Eds.) (1999). Exemplary techniques and conditions for curing flue-cured tobacco are set forth in Nestor et al., *Beitrage Tabakforsch. Int.*, 20, 467-475 (2003) and U.S. Pat. No. 6,895,974 to Peele, which are incorporated herein by reference. Representative techniques and conditions for air curing tobacco are set forth in Roton et al., *Beitrage Tabakforsch. Int.*, 21, 305-320 (2005) and Staaf et al., *Beitrage Tabakforsch. Int.*, 21, 321-330 (2005), which are incorporated herein by reference. Certain types of tobaccos can be subjected to alternative types of curing processes, such as fire curing or sun curing. Preferably, harvested tobaccos that are cured are then aged.

At least a portion of the plant of the *Nicotiana* species (e.g., at least a portion of the tobacco portion) can be employed in an immature form. That is, the plant, or at least one portion of that plant, can be harvested before reaching a stage normally regarded as ripe or mature. As such, for example, tobacco can be harvested when the tobacco plant is at the point of a sprout, is commencing leaf formation, is commencing flowering, or the like. At least a portion of the plant of the *Nicotiana* species (e.g., at least a portion of the tobacco portion) can be employed in a mature form. That is, the plant, or at least one portion of that plant, can be harvested when that plant (or plant portion) reaches a point that is traditionally viewed as being ripe, over-ripe or mature. As such, for example, through the use of tobacco harvesting techniques conventionally employed by farmers, Oriental tobacco plants can be harvested, burley tobacco plants can be harvested, or Virginia tobacco leaves can be harvested or primed by stalk position.

The *Nicotiana* species can be selected for the content of various compounds that are present therein. For example, plants can be selected on the basis that those plants produce relatively high quantities of one or more of the compounds desired to be bound and isolated therefrom. In certain embodiments, plants of the *Nicotiana* species (e.g., *Galpao commun* tobacco) are specifically grown for their abundance of leaf surface compounds. Tobacco plants can be grown in greenhouses, growth chambers, or outdoors in fields, or grown hydroponically.

Various parts or portions of the plant of the *Nicotiana* species can be employed. For example, virtually all of the plant (e.g., the whole plant) can be harvested, and employed as such. Alternatively, various parts or pieces of the plant can be harvested or separated for further use after harvest. For example, the flower, leaves, stem, stalk, roots, seeds, and various combinations thereof, can be isolated for further use or treatment.

The post-harvest processing of the plant or portion thereof can vary. After harvest, the plant, or portion thereof, can be used in a green form (e.g., the plant or portion thereof can be used without being subjected to any curing process). For example, the plant or portion thereof can be used without being subjected to significant storage, handling or processing conditions. In certain situations, it is preferable that the plant or portion thereof be used virtually immediately after harvest. Alternatively, for example, a plant or portion thereof in green form can be refrigerated or frozen for later use, freeze dried, subjected to irradiation, yellowed, dried, cured (e.g., using air drying techniques or techniques that employ application of heat), heated or cooked (e.g., roasted, fried or boiled), or otherwise subjected to storage or treatment for later use.

The harvested plant or portion thereof can be physically processed. The plant or portion thereof can be separated into individual parts or pieces (e.g., the leaves can be removed from the stems, and/or the stems and leaves can be removed from the stalk). The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders). The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent.

The plant of the *Nicotiana* species or portions thereof can be subjected to other types of processing conditions. For example, components can be separated from one another, or otherwise fractionated into chemical classes or mixtures of individual compounds. Typical separation processes can include one or more process steps (e.g., solvent extraction using polar solvents, organic solvents, or supercritical fluids), chromatography, distillation, filtration, recrystallization, and/or solvent-solvent partitioning. Exemplary extraction and separation solvents or carriers include water, alcohols (e.g., methanol or ethanol), hydrocarbons (e.g., heptane and hexane), diethyl ether methylene chloride and supercritical carbon dioxide. Exemplary techniques useful for extracting components from *Nicotiana* species are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated herein by reference. See also, the types of separation techniques set forth in Brandt et al., *LC-GC Europe*, p. 2-5 (March, 2002) and Wellings, *A Practical Handbook of Preparative HPLC* (2006), which are incorporated herein by reference. In addition, the plant or portions thereof can be subjected to the types of treatments set forth in Ishikawa et al., *Chem. Pharm. Bull.*, 50, 501-507 (2002); Tienpont et al., *Anal. Bioanal. Chem.*, 373, 46-55 (2002); Ochiai, *Gerstel Solutions Worldwide*, 6, 17-19 (2006); Coleman, III, et al., *J. Sci. Food and Agric.*, 84, 1223-1228 (2004); Coleman, III et al., *J. Sci. Food and Agric.*, 85, 2645-2654 (2005); Pawliszyn, ed., *Applications of Solid Phase Microextraction, RSC Chromatography Monographs*, (Royal Society of Chemistry, UK) (1999); Sahraoui et al., *J. Chrom.*, 1210, 229-233 (2008); and U.S. Pat. No. 5,301,694 to Raymond et al., which are incorporated herein by reference.

In certain embodiments, a molecularly imprinted polymer ("MIP") developed to selectively bind and isolate one or more compounds from a tobacco material or tobacco smoke is provided. A molecularly imprinted polymer is a polymeric material that exhibits high binding capacity and selectivity for a specific target molecule or class of target molecules. MIPs comprise cavities that are engineered to selectively bind one or more target molecules. Unlike most separation particles that exhibit only non-selective interactions, MIPs have a selective recognition site, which is sterically and/or chemically complementary to a particular target molecule or class of structurally related target molecules. General discussion of MIPs is provided, for example, in Cormack et al., *J. Chrom. B*. 804:173-182 (2004); U.S. Pat. No. 5,630,978 to Domb; and US Pat. Appl. Pub. Nos. 2004/0157209 to Yilmaz et al., 2005/0189291 to Sellergren et al., and 2010/0113724 to Yilmaz et al., which are incorporated herein by reference. MIPs have been studied for the selective removal of various compounds from mixtures. For example, US Pat. Appl. Pub. Nos. 2010/0239726 to Pertsovich, 2008/0038832 to Sellergren et al.; and 2004/0096979 to Petcu et al., which are all incorporated herein by reference, describe methods of removing safrole, nitro-containing compounds, and phenols, respectively, from mixtures.

MIPs are typically prepared by copolymerizing functional monomers and crosslinkers in the presence of a "template" molecule that provides a three-dimensional outline around which the polymer is formed. The functional monomers organize around the template molecule and are then locked into position by polymerization with the crosslinkers and other functional monomers. The template molecule can be the target molecule or a structural analogue which mimics the target molecule. The template molecule directs the organization of the functional groups on the monomer units, and, following preparation of the polymer, the template molecule is removed from the MIP, providing cavities that are designed for the specific binding of a target compound.

In certain embodiments, the template is the target compound. However, not all target molecules are amenable to templating. For example, a target compound may not be chemically inert under the polymerization conditions (e.g., where the compound contains one or more polymerizable groups, where the compound contains one or more groups that could inhibit or retard polymerization, and/or the compound is chemically unstable under the conditions at which the polymerization and/or cross-linking is conducted). For example, where the target molecule comprises one or more functional groups that are not expected to be chemically inert under the polymerization conditions, a template molecule is typically used wherein the non-inert functional group is replaced by a chemically inert functional group. Functional groups that are "chemically inert" will vary, based on the polymerization method and reagents. Certain functional groups that can be chemically inert in certain polymerizations include, but are not limited to, alkyl (including substituted alkyl where the alkyl is substituted with one or more other chemically inert groups), halo, ester, keto (oxo), amino, imino, carboxyl, hydroxy, alkoxy, aryloxy, amide, and nitrile.

Some target compounds may present a health risk, and thus, it would be beneficial to avoid using such compounds as templates. Further, some target compounds may be unavailable in sufficient quantities due to synthesis complexity, cost, or both, and thus, use of a more readily available analogue is desirable. In such embodiments, the template may be a molecule that is structurally similar to the target molecule (e.g., a geometric and/or isosteric analogue), but which does pose the problems noted above. Ideally, the template is in relatively pure form (e.g., comprising less than about 10%, less than about 5%, less than about 2%, or less than about 1% by weight of impurities).

The target molecule can be any compound that is advantageously removed from a tobacco material or smoke generated by a smoking article containing a tobacco material. In this regard, a "tobacco material" is any plant of the *Nicotiana* species or a portion thereof (e.g., stems, flowers, leaves, etc.) or any material derived from a plant of the *Nicotiana* species, such as tobacco seed oil or a tobacco extract (e.g., an aqueous, methanol, methylene chloride, ethyl acetate, or hexanes extract of a plant of the *Nicotiana* species or portion thereof) or a gas-phase (volatile) material released from a plant of the *Nicotiana* species or a portion thereof (e.g., volatile compounds released into the headspace around a living flower of a *Nicotiana* species). For exemplary compounds that are present in tobacco and/or tobacco smoke, see for example, Rodgman and Perfetti, The Chemical Components of Tobacco and Tobacco Smoke, CRC Press (2008).

In certain embodiments, the target molecule is an undesirable compound that is present in a tobacco material and/or tobacco smoke. For example, the target molecule may be a compound classified as a Hoffmann analyte (also referred to as a "Hoffmann-type analyte" or "Hoffman list compound") or a derivative thereof. Hoffmann analytes include: 1-aminonapthalene, 2-aminonapthalene, 3-aminobiphenyl, 4-aminobiphenyl, methyl ethyl ketone, acetaldehyde, acetone, acrolein, butyraldehyde, crotonaldehyde, formaldehyde, priopionaldehyde, catechol, hydroquinone, m-cresol, p-cresol, o-cresol, phenol, resorcinol, benzo(a)pyrene (BaP), ammonia, hydrogen cyanide, nitric oxide, carbon monoxide, acrylonitrile, 1,3-butadiene, benzene, isoprene, toluene, styrene, pyridine, quinoline, nicotine, arsenic, cadmium, chromium, lead, mercury, nickel, selenium, N'-nitrosoanabasine (NAB), N'-nitrosoanatabine (NAT), 4-(methylnitrosoamino)-1-(3-pyridyl)-1-butanone (NNK), N'-nitrosonornicotine (NNN), and tar. In addition to the Hoffmann analytes, other compounds have been identified as being potentially undesirable in cigarette smoke and may be targeted using MIPs according to the present invention.

Other target molecules comprise undesirable compounds that are present in tobacco materials (e.g., tobacco extracts). For example, certain Hoffmann analytes are present not only in tobacco smoke, but also in tobacco materials (e.g., tobacco extracts). In some embodiments, the target molecule is a compound commonly found in smokeless tobacco products. For certain undesirable compounds noted to be present in smokeless tobacco, see, for example, International Agency for Research on Cancer. Smokeless Tobacco and Some Tobacco-Specific N-Nitrosamines. Lyon, France: World Health Organization International Agency for Research on Cancer, IARC Monographs on the Evaluation of Carcinogenic Risks to Humans, Volume 89 (2007), which is incorporated herein by reference. Certain undesirable compounds that can be targets of the MIPS of the present invention include benzo[a]pyrene (BaP) or other polyaromatic hydrocarbons, formaldehyde, nitrosamines (including N'-nitrosonornicotine (NNN) and 4-(methylnitrosoamino)-1-(3-pyridyl)-1-butanone (NNK)), cyanide, benzene, lead, arsenic, nickel compounds, polonium-210, uranium-235, uranium-238, beryllium, cadmium, chromium, mixtures thereof, and derivatives thereof. As used herein, "polyaromatic hydrocarbons" refer to hydrocarbon structures that contain two or more fused aromatic rings. Other undesirable compounds that may be removed from tobacco or tobacco materials are Hoffmann analyte precursors. Hoffmann analyte precursors are typically proteins and/or fragments thereof.

Further, in certain embodiments, the target compound is a compound that may be disadvantageously present in a portion of the tobacco seed, e.g., in tobacco seed oil. For example, it may be beneficial to purify tobacco seed oil by removing certain compounds, such as pesticides (e.g., herbicides, insecticides, or rodenticides), fertilizers, or residues thereof. Exemplary pesticides that can be targeted for removal by MIPs according to the present invention include, but are not limited to, ethion, parathion, diazinon, methyl parathion, thiodan, bromopropylate, pirimiphos methyl, fenthion, prochloraz, pyridapenthion, malathion, chlorpyriphos, and imazalil. Particularly preferred are MIPs for the removal of malathion and thiodan.

As noted above, it may be desirable to use analogs of the target compounds as template molecules for MIP production. For example, a MIP for benzo[a]pyrene may be developed using BaP or a template molecule such as the BaP derivatives discussed by Ashwood-Smith et al., in *Mutat. Res.*, 57(2): 123-1255 (1978), which is incorporated herein by reference.

In certain embodiments, the target molecule is a desirable compound intended to add positive organoleptic properties, such as flavor, texture or aroma, to a tobacco composition or product. As used herein, an organoleptic target compound refers to a compound found naturally in one or more *Nicotiana* species that affects the sensory characteristics of a composition containing the compound, such as compounds that affect the taste, texture, or aroma of a composition. In particular, organoleptic compounds targeted in the present invention include flavorful or aromatic target compounds found in tobacco material and known to provide desirable organoleptic properties. Flavor compounds that can be targeted with MIPs according to the present invention include, but are not limited to, megastigmatrienones, β-damascenone, sclareolide, solanone, methyl salicylate, cinammic aldehyde, phenethyl alcohol, benzyl alcohol, methyl chavicol, geranyl acetone, 4-ketoisophorone, benzaldehyde, isophorone, eugenol, methoxy eugenol, heptanol, methyloctanoate, 2-methylpropionic acid, 2-methylbutyric acid, 4-methylpentanoic acid, hexanoic acid, hexadecanoic acid, octadecanoic acid, linalool, phenethyl alcohol, docecylacylate, nerolidol, octanoic acid, oleic acid, linolenic acid, 5-acetoxymethyl-2-furfural, farnesal, 1-hexadecane, 1-octadecene, phytol, vanillin, acetovanillin, cinnamaldehyde, cinnamyl alcohol, methylbenzoate, salicylaldehyde, benzylsalicylate, cembrenediols, isophorone, oximes, solavetivone, thunbergol, docecylacrylate, cembrenol, benylbenzoate, scaral, acetophenone, caryophyllene, aristolone, derivatives thereof, and mixtures thereof. Other notable compounds include, for example, those disclosed in U.S. patent application Ser. No. 12/688,294 filed on Jan. 15, 2010 and Ser. No. 12/764,613 filed on Apr. 21, 2010, both to Coleman, III et al., which are incorporated herein by reference. Additional examples of suitable target compounds are described as natural tar diluents in PCT WO 2007/012980 to Lipowicz, which is incorporated herein by reference.

In certain embodiments, the target compound is a fatty acid or triglyceride found in tobacco material, particularly in tobacco seeds. Exemplary fatty acids include palmitic acid, linoleic acid, oleic acid, caprylic acid, myristic acid, pentadecanoic acid, palmetoleic acid, heptadecanoic acid, heptadecenoic acid, elaidic acid, gamma-lenolenic acid, arachidic acid, arachidonic acid, 11-eicosenoic acid, 8,11,14-eicosatrieonic acid, 11, 14,17-eicosatrienoic acid, 5,8,11,14, 17-eicosopentanoic acid, heniecosenoic acid, lignoceric acid, 4,7,10,15,19-decosahexanoic acid, and stearic acid. Exemplary triglycerides include trilinolein, palmito-di-linolein, di-palmito-linolein, tripalmitin, tristearin, and triolein.

For examples of compounds that can be used as template molecules for certain of the flavor compounds noted herein, see Table 1, below. The exemplary template molecules disclosed in Table 1 are not meant to be exhaustive; rather, this table provides representative target molecules and derivatives thereof that may be useful in developing MIPs for the target molecules. One of skill in the art would be readily aware of other means of derivatizing target molecules to produce molecules that are amenable to templating.

Table 1

Exemplary template molecules for certain target molecules (flavor compounds)

| Target molecule (flavor compound) | Exemplary template molecules |
|---|---|

Table 1-continued

Exemplary template molecules for certain target molecules (flavor compounds)

| Target molecule (flavor compound) | Exemplary template molecules |
|---|---|
| Solanone | |
| Eugenol | |
| Sclareolide | |
| β-damascenone | |

Table 1-continued
Exemplary template molecules for certain target molecules (flavor compounds)
| Target molecule (flavor compound) | Exemplary template molecules |
|---|---|
| 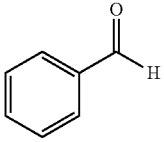 Benzaldehyde | 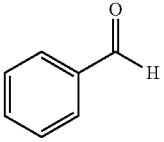 |
| 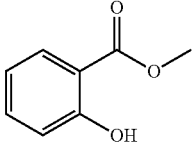 Methyl Salicylate | 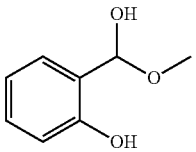 |
| 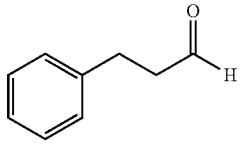 Cinnamic Aldehyde | 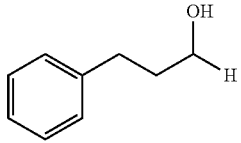 |
| 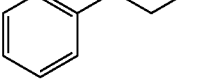 Phenethyl Alcohol | 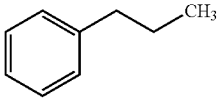 |

Table 1-continued

Exemplary template molecules for certain target molecules (flavor compounds)

| Target molecule (flavor compound) | Exemplary template molecules |
|---|---|
| 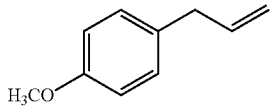<br>Methyl Chavicol | 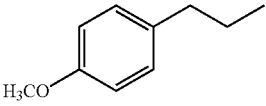<br>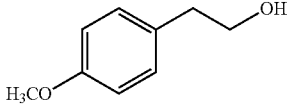 [SMILES: COc1ccc(CCO)cc1] |
| 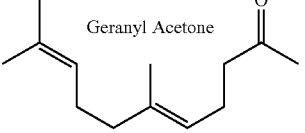<br>Geranyl Acetone | 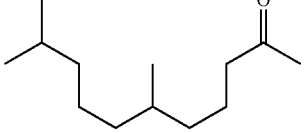<br>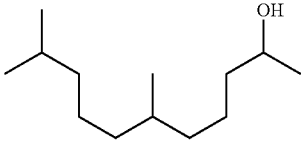<br>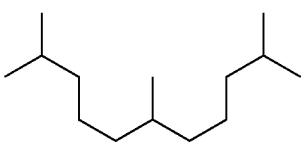 |
| 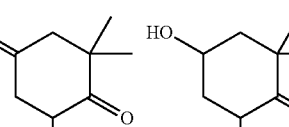<br>4-Keto Isophorone | 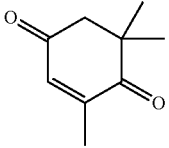 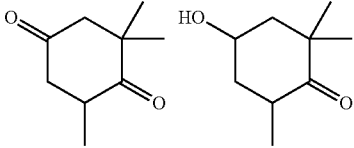<br>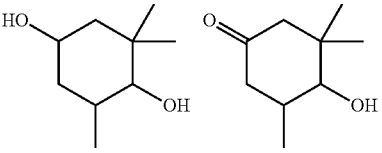 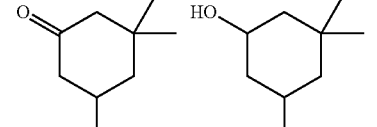 |
| 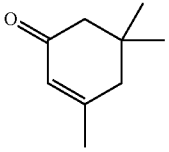<br>Isophorone | 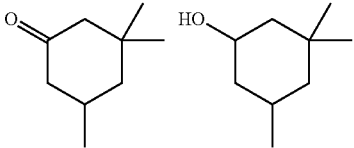 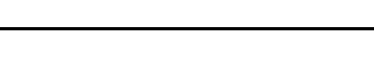 |

Any method of polymer synthesis can be used to produce MIPs. For example, cationic or anionic polymerization may be used. Free radical polymerization is the most commonly used method for the preparation of MIPs. The preparation of MIPs by free radical polymerization typically requires one or more monomers, one or more crosslinkers, one or more initiators, and, optionally, one or more solvents, in addition to the template molecule.

In certain embodiments, the monomers are chosen such that the monomers comprise one or more functional groups that can specifically interact with the template molecule via covalent or non-covalent interactions. In some embodiments, a labile covalent interaction is desired between the template and the monomers, wherein the template is reversibly covalently bonded to one or more monomers. Covalent-type molecular imprinting is discussed, for example, in U.S. Pat. No. 4,127,730 to Wulff et al., which is incorporated herein by reference. In other embodiments, a weaker intermolecular interaction between the template and the monomers is desired (e.g., metal-ligand complexation, hydrogen bonding, ionic, π-π, dipole, or hydrophobic interaction). Non-covalent-type molecular imprinting is discussed, for example, in U.S. Pat. No. 5,110,833 to Mosbach et al., which is incorporated herein by reference. The requirements for the preparation and use of MIPs prepared via covalent and non-covalent binding are different. For example, parameters such as the ratios of functional monomer, crosslinker, and template; reaction conditions; and the post-production treatment of the MIPs may vary. Further, various other (e.g., hybrid covalent and non-covalent) molecular imprinting methods have been developed, and are also encompassed by the present invention.

Various monomers that can be polymerized via radical polymerization may be used to produce MIPs according to the present invention. In such embodiments, functional vinyl monomers are typically used in combination with cross-linking multifunctional monomers. In some embodiments, the monomers may comprise acidic, basic, and/or neutral functionalities capable of interacting with the template molecule. In other words, the monomers can contain functional or non-functional (i.e., steric) groups that are complementary to those of the template and/or target molecule.

In some embodiments, any one or more of the many commercially available vinyl, acrylic, amide, allyl, urethane, phenol, boronate, orgaonsiloxane, carbonate ester, sulfonic acid, or styrenic monomers can be effectively polymerized to produce a MIP according to the present invention. For a discussion of some exemplary free radically polymerizable vinyl monomers that may be used, see for example H. Mark, et al., Ed., Encyclopedia of Polymer Science and Engineering, $2^{nd}$ Ed., Vol. 13, John Wiley & Sons, New York, 1988, p. 708-713, which is incorporated herein by reference. Suitable vinyl monomers include, but are not limited to, vinyl halides such as vinyl chloride, vinyl fluoride and vinylidene fluoride, vinyl ethers such as methyl vinyl ether and perfluoro(methyl vinyl ether), chloroprene, isoprene, vinyl esters such as vinyl acetate, and styrenic and acrylic monomers. Specific exemplary monomers that may be used to produce MIPs include, but are not limited to, ethylene, acrylic acid, methacrylic acid, trifluoromethacrylic acid, methyl methacrylic acid, methyl methacrylate, glycerol monoacrylate, glycerol monomethacrylate, ethylene glycol dimethacrylate, hydroxyethylmethacrylate (HEMA), trans-3-(3-pyridyl)-acrylic acid, styrene, 4-ethyl styrene, p-vinyl benzoic acid, 4-vinylpyridine, 4-vinylbenzyl-trimethyl ammionium chloride, 4(5)-vinyl imidazole, styrene, acrylamide, methacrylamide, vinylpyrrolidone, acrylonitrile, 4-vinyl benzamidine, 2-vinylpyridine, 1-vinylimidazole, acrylamido-(2-methyl)-1-propane sulfonic acid, itaconic acid, and derivatives and mixtures thereof. For other exemplary monomers, see U.S. Pat. No. 5,630,978 to Domb and US Pat. Appl. Pub. No. 2007/0106041 to Sellergren et al., which are incorporated herein by reference. Further suitable monomers can be identified by one of skill in the art. In some embodiments, synthetic monomers are prepared for use in generating MIPs according to the invention. One exemplary MIP is a styrene-divinylbenzene resin with sulfonic acid groups. In certain embodiments, two or more vinyl monomers are polymerized to give copolymeric MIPs. In some embodiments, the template molecule is covalently bound to a monomer prior to polymerization. In other embodiments, the template molecule is separately added to the reaction mixture.

Radical polymerization typically requires one or more initiators to provide an initial source of free radicals. Various types of initiators may be used to prepare MIPs according to the present invention. For example, a peroxide (e.g., benzoyl peroxide), persulfate, or azo compound (e.g., azobisisobutyronitrile (AIBN) or azobisdimethylvaleronitrile) may be added to the reaction mixture. Radical species can be formed from the initiator, for example, by ionizing radiation (e.g., photolysis or thermolysis) to give stabilized, carbon-centered radicals capable of initiating the growth of polymers).

In preferred embodiments, one or more crosslinking agents are also added to the reaction mixture to form the MIP. The selectivity of the final MIP is typically greatly influenced by the nature and amount of crosslinking agent used in the polymerization. The crosslinking agent typically helps to control the morphology of the polymer matrix, stabilizes the imprinted binding site, and imparts mechanical stability to the polymeric matrix. The crosslinking agent may be any molecule capable of crosslinking two or more of the monomer units (e.g., the crosslinking agent is di-, tri-, or tetra-functional). Specific crosslinking agents include, but are not limited to, di-, tri-, and tetra-functional acrylates and methacrylates, divinylbenzene (DVB), alkylene glycol and polyalkylene glycol diacrylates and methacrylates, including ethylene glycol dimethacrylate (EGDMA/EDMA) and ethylene glycol diacrylate, vinyl or allyl acrylates or methacrylates, diallyldiglycol dicarbonate, diallyl maleate, diallyl fumarate, diallyl itaconate, vinyl esters such as divinyl oxalate, divinyl malonate, diallyl succinate, triallyl isocyanurate, the methacrylates or diacrylates of bis-phenol A or ethoxylated bis-phenol A, methylene or polymethylene bisacrylamide or bismethacrylamide, including hexamethylene bisacrylamide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, 1,1-dimethyl-2-isocyanato ethyl acrylate, tetraethylene glycol diacrylate, tetraethylene glycol dimethacrylate, triethylene glycol diacrylate, triethylene glycol dimethacrylate, hexanediol dimethacrylate, hexanediol diacrylate, and mixtures thereof. Other crosslinking agents include, but are not limited to, glutaraldehyde, bisimidate, N-hydroxysuccinamide, 2-hydroxy-ethylene-glycol, pentaerythritol triacrylate, trimethylolpropane trimethacrylate (TRIM), N,N'-1,3-phenylenediacrylamide, N,N'-methylenediacrylamide, 3,5-bis(acryloylamido)benzoic acid, N,O-bisacryloyl phenylalaninol, 1,3-diisopropenyl benzene, tetramethylene dimethacrylate, 2,6-bisacryloylamidopyridine, bisacryloyl piperazine, and mixtures thereof. The crosslinking agent or agents are typically present in relatively high proportions (e.g., greater than about 50% or greater than about 75%), although any ratio can be used to provide a material with the desired integrity and stable binding cavities within the MIP.

Although in many embodiments, cross-linking the polymeric material in the presence of the template molecule is desirable to produce distinct, well-defined binding cavities within the polymer, it is also possible in other embodiments to use a polymer designed to bind the target molecule without imprinting. Such polymers, commonly referred to as "non-imprinted polymers," or "NIPs" are typically designed to contain moieties capable of interaction (e.g., specific interaction) with one or more target compounds, but are prepared without a template molecule and are generally not cross-linked. While the disclosure of the present application focuses on the use of MIPs, it is understood that the materials and methods described herein are also applicable to NIPs. NIPs can be designed for any of the target compounds noted herein. For example, NIPs can be developed and used to extract and/or isolate Hoffmann analytes or organoleptic compounds found naturally in one or more *Nicotiana* species. The NIP can be used, for example, within a filter element of a smoking article or in a method for isolating a target compound from a tobacco extract or slurry. In certain cases, appropriately-designed NIPs are capable of achieving similar selectivity and extraction capabilities as MIPs.

The polymerization for the production of a MIP (or NIP) may be conducted in "neat" form (i.e., no solvent is used). However, in preferred embodiments, the polymerization is conducted in any solvent that dissolves the starting materials and, preferably, allows for sufficient template-monomer interaction. In addition to facilitating the polymerization, the solvent can act as a porogen, creating the pores in macroporous MIPs. The nature and volume of the porogen can be adjusted to control the morphology and total pore volume within the MIP. In some embodiments, the solvent may be chosen such that it stabilizes non-covalent interactions between the template and the monomers. For example, the solvent may comprise a nonpolar aprotic solvent to stabilize hydrogen bonds formed between the template and the monomer, or the solvent may comprise water to stabilize hydrophobic forces between the template and the monomer. Solvents for the preparation of MIPs according to the present invention include, but are not limited to, benzene, toluene, xylene, cyclohexane, chloroform, methylene chloride, dichloroethane, tetrahydrofuran, acetonitrile, dimethylformamide (DMF), ethyl acetate, dioxane, dimethylsulfoxide (DMSO), isopropanol, methanol, ethanol, water, and mixtures thereof.

The concentration of reagents may vary. For example, the monomer(s), crosslinker(s), and template molecule in combination are present at about 20% to about 80% by weight of the mixture including solvent (e.g., about 50%). In certain embodiments, the temperature of the reaction and the reaction time will vary. In certain embodiments, the polymerization is conducted in an environment with reduced levels of oxygen (e.g., in an inert environment). For example, the polymerization may be conducted in the presence of an inert gas such as nitrogen or argon (e.g., by evacuating the headspace of the reaction flask to remove oxygen and backfilling the headspace with the inert gas).

In some embodiments, the MIP is processed prior to removal of the template molecule and/or after removal of the template molecule. For example, the bulk MIP material may be pulverized, crushed, and/or sieved to obtain particles. The particle size may vary depending upon the specific application of the MIP. For example, particles may be sieved to provide particles with an average particle size of between about 1 µm and about 1 mm, and preferably between about 1 and about 200 µm, although other applications may call for other particle size ranges. The MIP may be treated with heat to facilitate removal of template molecules. In certain embodiments, the MIP is produced in the form of a bead, for example by preparing the MIP in bead form or by grafting or coating a MIP onto a preformed microsphere or nanosphere. In certain embodiments, the polymerization may be conducted on solid supports to give MIP-coated supports, such as described in U.S. Pat. No. 6,759,488 to Sellergren et al., which is incorporated herein by reference. Various other forms of MIPs may be produced according to the present invention including, but not limited to, films, membranes, nanowires, and micromonoliths.

In certain embodiments, the MIPs are processed to provide material of a specific size for the desired application (e.g., by passing ground material through a sieve of a given size to exclude larger particles). Following preparation of the MIP, the template molecule is removed. The method by which the template molecule can be removed is dependent on the nature and strength of the interaction between the monomer and the template molecule. In some embodiments, a non-covalent interaction between the monomer and the template molecule may be broken by washing the material with a solvent in which the template molecule is soluble to remove the template molecule from the MIP. For example, where the interaction comprises hydrogen bonding, washing the material with a polar solvent may sufficiently disrupt the hydrogen bonding and release the template molecule from the MIP. In some cases, washing with an acid or base may be required to release the template molecule. A covalent bond between the monomer and template molecule typically requires harsher conditions. Covalent bonding requires an appropriate agent to break the bonds between the template and the functional elements of the monomer. For example, in some embodiments, an acid or base may be added to release the template molecule from the MIP.

In some embodiments, the template molecule may be removed by repeated washings. In some embodiments, the solvent remains in contact with the MIP material for a period of time (e.g., between about 2 and about 24 hours). The solvent and MIP material may be continually mixed. The polymer is then separated from the solvent and in some embodiments, is washed with fresh solvent and dried. Preferably, most of the template molecules are removed from the MIP. The amount of template removed from the composition correlates to the amount of target molecule the MIP can capture. For example, the MIP can be treated such that it retains less than about 10% by weight of the initial amount of template, less than about 5% by weight of the initial amount of template, less than about 1% by weight of the initial amount of template.

Routine experimentation may be required to design and develop MIPs for a certain target molecule or class of target molecules with the desired selectivity. For example, optimal synthetic conditions (e.g., nature and content of template molecule, monomer(s), cross-linker(s), solvent(s), and polymerization conditions) may be screened before a MIP is selected for use according to the methods of the present invention. For example, a combinatorial-type process may be used. See for example, Takeuchi et al., Anal. Chem. 71: 285-290 (1999), which is incorporated herein by reference. In certain embodiments, computer-aided design may be used. See, for example, US Pat. Appl. Pub. No. 2008/0214405 to Chen et al., which is incorporated herein by reference in its entirety.

The MIPs of the present application have numerous applications in the area of tobacco. For example, MIPs may be useful to remove undesirable components from mainstream smoke in cigarette filters, to remove undesirable compounds from tobacco materials (e.g., tobacco extracts), and/or to extract desirable flavor components from tobacco materials.

In certain embodiments, the present invention provides a method of removing one or more undesirable gas-phase compounds from tobacco smoke. The MIP may be engineered so as to be specific for any undesirable gas-phase compound. For example, in certain embodiments, a MIP may be developed for the removal of one or more Hoffmann analytes, which are discussed in greater detail above. MIPs have previously been developed, for example, to remove nicotine from tobacco smoke (see Liu et al., *Anal. Lett.* 36(8): 1631-1645 (2003), which is incorporated herein by reference), and to remove TSNAs in the vapor phase of the thermal decomposition products of smoking materials (see US Pat. Appl. Pub. No. 2007/0186940 to Bhattacharyya et al., which is incorporated herein by reference). Commercially available MIPs include SupelMIP™ PAH for the selective removal of polyaromatic hydrocarbons (PAHs), including benz[a]anthracene, benzo[a]pyrene, benzo[b]fluoranthene, benzo[k]fluoranthene, chrysene, dibenz[a,h]anthracene, and indeno[1,2,3-cd]pyrene; SupelMIP™ TSNAs for the selective removal of tobacco-specific nitrosamines (TSNAs), including N'-nitrosonornicotine (NNN), (4-methylnitrosamino)-1-(3-pyridyl)-1-butanone (NNK), N'-nitrosoanatabine (NAT), and N'-nitrosoanabasine (NAB); and SupelMIP™ NNAL for the selective removal of tobacco-specific nitrosamine NNAL, all developed by MIP Technologies and available through Sigma-Aldrich, as well as Biotage® Affinilute MIPs (e.g., Affinilute MIP-TSNAs for the selective removal of TSNAs, including NNN, NNK, NAT, and NAB; Affinilute MIP-NNAL for the selective removal of NNAL, a metabolite of NNK and Affinilute MIP-PAH for the selective removal of various PAH compounds, including BaP).

In one embodiment of the present invention, a MIP engineered for the selective removal of one or more undesirable gas-phase compounds is incorporated within any portion of a cigarette to facilitate removal of compounds from cigarette smoke. Accordingly, smoking articles comprising one or more MIPs are provided according to the invention. Referring to FIG. 1, a smoking article 10 in the form of a cigarette is shown. The cigarette 10 includes a generally cylindrical rod 12 of a charge or roll of smokable filler material contained in a circumscribing wrapping material 16. The rod 12 is conventionally referred to as a "tobacco rod". The ends of the tobacco rod are open to expose the smokable filler material. One end of the tobacco rod 12 is the lighting end 18 and a filter element 20 is positioned at the other end. The cigarette 10 is shown as having one optional printed band 22 on wrapping material 16, and that band circumscribes the cigarette rod in a direction transverse to the longitudinal axis of the cigarette. That is, the band provides a cross-directional region relative to the longitudinal axis of the cigarette. The band can be printed on the inner surface of the wrapping material (i.e., facing the smokable filler material) or on the outer surface of the wrapping material. Although the cigarette shown in FIG. 1 possesses wrapping material having one optional band, the cigarette also can possess wrapping material having further optional spaced bands numbering two, three, or more.

The cigarette 10 includes a filter element 20 positioned adjacent one end of the tobacco rod 12 such that the filter element and tobacco rod are axially aligned in an end-to-end relationship, preferably abutting one another. Filter element 20 has a generally cylindrical shape, and the diameter thereof is essentially equal to the diameter of the tobacco rod. The ends of the filter element 20 are open to permit the passage of air and smoke therethrough. The filter element 20 includes at least one segment or section of filter material that is overwrapped along the longitudinally extending surface thereof with circumscribing plug wrap material 26. A typical plug wrap material 26 is a paper material, such as a paper that is porous or non-porous to air flow. The filter element 20 can have two or more segments of filter material, and/or flavor additives incorporated therein.

The filter element 20 is attached to the tobacco rod 12 by tipping material 28, which circumscribes both the entire length of the filter element and an adjacent region of the tobacco rod. The inner surface of the tipping material 28 is fixedly secured to the outer surface of the plug wrap 26 and the outer surface of the wrapping material 16 of the tobacco rod using a suitable adhesive. A ventilated or air diluted smoking article is provided with an air dilution means, such as a series of perforations 30, each of which extend through the tipping material 28 and plug wrap 26. When air diluted, the filter element normally is ventilated to provide a cigarette having an air dilution between about 10 and about 75 percent, preferably about 30 to about 40 percent. As used herein, the term "air dilution" is the ratio (expressed as a percentage) of the volume of air drawn through the air dilution means to the total volume of air and smoke drawn through the cigarette and exiting the extreme mouth end portion of the cigarette. See, Selke, et al., Beitr. Zur Tabak. In., Vol. 4, p. 193 (1978). The perforations 30 can be made by various techniques known to those of ordinary skill in the art. For example, the perforations 30 can be made using mechanical or microlaser offline techniques or using online laser perforation.

The dimensions of a representative cigarette 10 can vary. Preferred cigarettes are rod shaped and have circumferences of about 17 mm to about 27 mm. The total length of the cigarette 10 is typically about 80 mm to about 150 mm. The length of the filter element 20 can vary. Typical filter elements can have lengths of about 15 mm to about 65 mm, frequently about 25 to about 50 mm. The tipping paper 28 will typically circumscribe the entire filter element 20 and about 4 mm of the length of the tobacco rod 12 in the region adjacent to the filter element.

The wrapping materials used to circumferentially wrap the tobacco rod can vary. Preferably, the wrapping material is a paper material, such as the type of paper material typically used in cigarette manufacture. The wrapping material can have a wide range of compositions and properties. The selection of a particular wrapping material will be readily apparent to those skilled in the art of cigarette design and manufacture. Smokable rods can have one layer of wrapping material; or smokable rods can have more than one layer of circumscribing wrapping material, such as is the case for the so-called "double wrap" smokable rods. The wrapping material can be composed of materials, or be suitably treated, in order that the wrapping material does not experience a visible staining as a result of contact with components of the smokable material (e.g., aerosol forming material). Exemplary types of wrapping materials, wrapping material components and treated wrapping materials are described in U.S. Pat. No. 5,105,838 to White et al.; U.S. Pat. No. 5,271,419 to Arzonico et al. and U.S. Pat. No. 5,220,930 to Gentry; PCT WO 01/08514 to Fournier et al.; PCT WO 03/043450 to Hajaligol et al.; US Pat. Application 2003/0114298 to Woodhead et al.; US Pat. Application 2003/0131860 to Ashcraft et al.; and U.S. patent application Ser. No. 10/324,418, filed Dec. 20, 2002; Ser. No. 10/440, 290, filed May 16, 2003; and Ser. No. 10/645,996, filed Aug. 12, 2003, which are incorporated herein by reference in their entireties. Representative wrapping materials are commercially available as R. J. Reynolds Tobacco Company Grades 119, 170, 419, 453, 454, 456, 465, 466, 490, 525, 535, 557, 652, 664, 672, 676 and 680 from Schweitzer-Maudit International. The porosity of the wrapping material can vary, and frequently is between about 5 CORESTA units and about 100 CORESTA units, often is between about 10 CORESTA units and about 90 CORESTA units, and frequently is between about 20 CORESTA units and about 80 CORESTA units.

The wrapping material typically incorporates a fibrous material and at least one filler material imbedded or dispersed within the fibrous material. The fibrous material can vary. Most preferably, the fibrous material is a cellulosic material. Preferably, the filler material has the form of essentially water insoluble particles. Additionally, the filler material normally incorporates inorganic components. The filler material may comprise catalysts or adsorbent materials capable of adsorbing or reacting with vapor phase components of mainstream smoke. Filler materials incorporating calcium salts are particularly preferred. One exemplary filler material has the form of calcium carbonate, and the calcium carbonate most preferably is used in particulate form. See, for example, U.S. Pat. No. 4,805,644 to Hampl; U.S. Pat. No. 5,161,551 to Sanders; and U.S. Pat. No. 5,263,500 to Baldwin et al.; and PCT WO 01/48,316. Other filler materials include agglomerated calcium carbonate particles, calcium tartrate particles, magnesium oxide particles, magnesium hydroxide gels; magnesium carbonate-type materials, clays, diatomaceous earth materials, titanium dioxide particles, gamma alumina materials and calcium sulfate particles. The filler can be selected so as to impart certain beneficial characteristics to the wrapping material, such as modification of combustion properties or the ability to adjust the character and content of mainstream smoke (e.g., by adsorption of certain compounds).

The production of filter rods, filter rod segments and filter elements, and the manufacture of cigarettes from those filter rods, filter rod segments and filter elements, can be carried out using the types of equipment known in the art for such uses. Multi-segment cigarette filter rods can be manufactured using a cigarette filter rod making device available under the brand name Mulfi from Hauni-Werke Korber & Co. KG. Six-up rods, four-up filter rods and two-up rods that are conventionally used for the manufacture of filtered cigarettes can be handled using conventional-type or suitably modified cigarette rod handling devices, such as tipping devices available as Lab MAX, MAX, MAX S or MAX 80 from Hauni-Werke Korber & Co. KG. See, for example, the types of devices set forth in U.S. Pat. No. 3,308,600 to Erdmann et al.; U.S. Pat. No. 4,281,670 to Heitmann et al.; U.S. Pat. No. 4,280,187 to Reuland et al.; and U.S. Pat. No. 6,229,115 to Vos et al.

Tobacco materials within the cigarette useful for carrying out the present invention can vary. Tobacco materials can be derived from various types of tobacco, such as flue-cured tobacco, burley tobacco, Oriental tobacco or Maryland tobacco, dark tobacco, dark-fired tobacco and *Rustica* tobaccos, as well as other rare or specialty tobaccos, or blends thereof. Descriptions of various types of tobaccos, growing practices, harvesting practices and curing practices are set for in Tobacco Production, Chemistry and Technology, Davis et al. (Eds.) (1999). Most preferably, the tobaccos are those that have been appropriately cured and aged.

In certain embodiments, one or more MIPs can be incorporated into a cigarette filter, and/or into cigarette wrapping paper by any means for introducing a material into a cigarette. In some embodiments, the MIP may be directly used, or it may be used as a coating on one or more components of a cigarette. For exemplary means by which a MIP can be incorporated into a cigarette filter, see US Patent Application Publication Nos. 2007/0186940 to Bhattacharyya et al. and 2008/0245376 to Travers et al., which are incorporated herein by reference. In some embodiments, the MIP may be incorporated within a removable portion of the cigarette. Such a removable portion can be reused multiple times in certain embodiments (e.g., by regenerating the MIP, as described in more detail herein).

Figure 2:
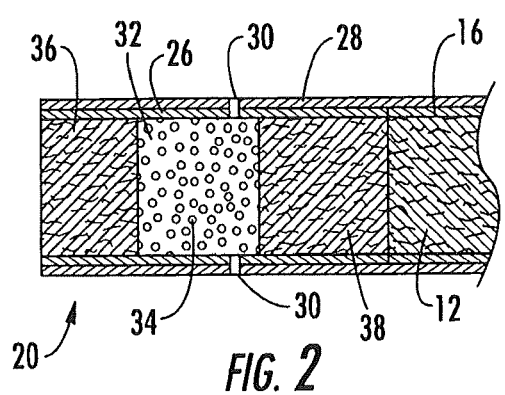
FIG. 2 is a cross-sectional side view of a cigarette of the invention wherein the filter element comprises a molecularly imprinted polymer positioned within a compartment therein.

In one particular embodiment, a cigarette filter is provided, which comprises one or more MIPs to selectively remove one or more undesirable gas-phase compounds from cigarette smoke. One exemplary embodiment of the filter element, which is adapted for use with smoking articles such as cigarettes, is illustrated in FIG. 2. The filter element typically comprises multiple longitudinally extending segments. Each segment can have varying properties and may include various materials capable of filtration or adsorption of particulate matter and/or vapor phase compounds. Typically, the filter element of the invention includes 2 to 6 segments, frequently 2 to 4 segments. In one embodiment, the filter element includes a mouth end segment, a tobacco end segment and a compartment therebetween. This filter arrangement is sometimes referred to as a "compartment filter" or a "plug/space/plug" filter. The compartment may be divided into two or more compartments as described in greater detail below.

In this embodiment, at least one molecularly imprinted polymer 34 capable of selectively removing at least one gas phase component of mainstream smoke is incorporated into the filter element. The amount of molecularly imprinted polymer 34 within the filter element typically ranges from about 50 to about 250 mg, often about 80 to about 150 mg, and frequently about 90 to about 120 mg. The form of the molecularly imprinted polymer 34 may vary. Typically, the molecularly imprinted polymer 34 is used in granular or particulate solid form having a particle size of between about 8×16 mesh to about 30×70 mesh using the U.S. sieve system. However, smaller or larger particles could be used without departing from the invention. The terms "granular" and "particulate" are intended to encompass both non-spherical shaped particles and spherical particles.

The manner in which the molecularly imprinted polymer 34 is incorporated into the filter element may vary. As shown in the drawing, granulated molecularly imprinted polymer can be placed in a compartment within the filter element. However, the molecularly imprinted polymer 34 could also be imbeded or dispersed within a section of filter material, such as a fibrous filter material (e.g., cellulose acetate tow), or incorporated into a paper. In addition, a molecularly imprinted polymer 34 could be placed both in a compartment and imbedded in one or more of the sections of filter material, and the molecularly imprinted polymer in the compartment and the molecularly imprinted polymer imbedded or dispersed in the filter material can be the same or different.

FIG. 2 illustrates one embodiment of the filter element 20 of the invention comprising a first section of filter material 36, such as a fibrous filter material (e.g., plasticize cellulose acetate tow) and a second section of filter material 38 spaced apart from the first section of filter material. As shown, the first section of filter material 36 is positioned at the mouth end of the filter element 20 and the second section of filter material 38 is positioned proximal to the tobacco rod 12. The space between the first section of filter material 36 and the second section of filter material 38 define a compartment 32. At least a portion of the compartment 32 contains a molecularly imprinted polymer 34, preferably in granular form. Typically, substantially the entire compartment 32 contains molecularly imprinted polymer 34.

In practice, the smoke passes through the filter, and the target molecule for which the MIP is tailored is selectively retained by the MIP; the filtered smoke, having reduced levels of the target molecule, is then delivered to the user. The incorporation of a MIP for the selective removal of one or more gas-phase compounds from tobacco smoke can produce a cigarette which provides the smoker with a reduced level of one or more undesirable gas phase compounds (e.g., a reduced level of one or more Hoffmann analytes). For example, cigarettes with reduced levels of certain inorganic gases, metals, aldehydes, poly aromatic hydrocarbons, volatile hydrocarbons, heterocyclic compounds, aromatic amines, N-heterocyclic amines, N-nitrosamines, and other organic compounds, can be provided according to the invention. The content of target compound in mainstream smoke from the cigarette delivered to the user may be reduced by about 20%, 50%, 70%, 80%, or 90% as compared with the content of target compound originally present in the tobacco smoke. Certain cigarettes of the present invention, incorporating MIPs selective for one or more Hoffman analytes, may provide at least about 5%, at least about 10%, at least about 20%, at least about 50%, at least about 70%, at least about 80%, or at least about 90% reduction of the one or more Hoffmann analytes in mainstream smoke as compared with cigarettes that do not comprise MIPs.

In other embodiments, one or more MIPs are used for the selective removal of one or more desirable or undesirable compounds present in tobacco and/or in a tobacco material in liquid or gaseous form (e.g., an extract). For example, the invention provides a method by which a sample known (or assumed to) contain a particular desirable or undesirable (target) compound is brought into contact with a MIP that is specific for that compound, developed according to the procedure described herein. According to the invention, a MIP may be tailored so as to be specific for any desirable gas- or liquid-phase compound that is expected to be present in tobacco or a tobacco material.

For example, the invention provides a method for the selective removal of one or more undesirable compounds from tobacco or tobacco materials. In certain embodiments, the one or more undesirable compounds are compounds noted to be carcinogenic agents. For certain undesirable compounds noted to be present in smokeless tobacco, see, for example, International Agency for Research on Cancer. Smokeless Tobacco and Some Tobacco-Specific N-Nitrosamines. Lyon, France: World Health Organization International Agency for Research on Cancer, IARC Monographs on the Evaluation of Carcinogenic Risks to Humans, Volume 89 (2007), which is incorporated herein by reference. Undesirable compounds include, but are not limited to, benzo[a]pyrene (BaP), formaldehyde, nitrosamines (including N'-nitrosonornicotine (NNN) and 4-(methylnitrosoamino)-1-(3-pyridyl)-1-butanone (NNK)), cyanide, benzene, lead, arsenic, nickel compounds, polonium-210, uranium-235, uranium-238, beryllium, cadmium, chromium, mixtures thereof, and derivatives thereof. Other undesirable compounds that may be removed from tobacco or tobacco materials are Hoffmann analyte precursors. Certain Hoffmann analyte precursors comprise proteins and/or fragments thereof.

As another example, the invention provides a method for the selective removal and/or isolation of one or more desirable compounds from tobacco or tobacco materials, for example, compounds capable of enhancing the sensory characteristics of tobacco products. Such desirable compounds include, but are not limited to, megastigmatrienones, β-damascenone, sclareolide, solanone, methyl salicylate, cinammic aldehyde, phenethyl alcohol, benzyl alcohol, methyl chavicol, geranyl acetate, 4-keto-isophorone, benzaldehyde, isophorone, eugenol, derivatives thereof, and mixtures thereof. In some embodiments, the desirable compounds are compounds that are naturally present in tobacco or compounds that are produced upon treatment of tobacco (e.g., compounds present in an extract or compounds present in a chemically transformed isolate of tobacco or a component thereof prepared via acid/base reaction, hydrolysis, thermal treatment, enzymatic treatment, or a combination thereof). Other desirable compounds that can be bound, removed and/or isolated include compounds that are present in mixtures of compounds derived from tobacco flowers reported to enhance the sensory characteristics of a tobacco composition, as disclosed in U.S. patent application Ser. No. 12/688,294 to Coleman et al., filed Jan. 15, 2010, which is incorporated herein by reference.

In some embodiments, the tobacco or tobacco material comprises a specific part of a tobacco plant (e.g., the leaf, stem, stalk, roots, seeds (e.g., seed oil), flower, or some combination thereof). The tobacco or tobacco material may be in various forms discussed herein, including mature, cured, or green forms. The tobacco or tobacco material may be used directly or may be processed in some way prior to being brought into contact with a MIP according to the invention. In certain embodiments, the tobacco or tobacco material comprises a tobacco extract, for example, a methanol, ethanol, hexanes, methylene chloride, ethyl acetate, or aqueous extract. In certain embodiments, the tobacco or tobacco material comprises tobacco seed oil. In other embodiments, vapor-phase components of tobacco plants are treated with a MIP to bind and/or isolate one or more target compounds therefrom. For example, the vapor phase components from the headspace of a growth chamber containing a living flower of a tobacco plant, as discussed, for example, in U.S. patent application Ser. No. 12/688,294 to Coleman et al., filed Jan. 15, 2010, which is incorporated herein by reference, can be brought into contact with a MIP engineered to bind one or more target compounds therefrom.

In some embodiments, the MIP may be used as a chromatographic stationary phase, either alone or in combination with another stationary phase. For example, the MIP may be packed into a cylinder. The MIP may be present within a solid phase extraction (SPE) cartridge. In such embodiments, the sample, typically in solution form, is passed through the stationary phase by means of pressure, gravity, or suction. In other embodiments, the MIP is simply added directly to the tobacco or tobacco material. In some embodiments, the tobacco or tobacco material is agitated with a MIP to ensure binding of the target compound in the tobacco or tobacco material to the imprinted sites within the MIP. In other embodiments, the MIP is contained within a device (e.g., a "tea bag") that is permeable to the tobacco or tobacco material. These examples for bringing the MIP in contact with the tobacco or tobacco material are not meant to be limiting; any means by which the MIP can be brought into contact with the tobacco or tobacco material are also intended to be encompassed by the present invention.

After contacting the tobacco or tobacco material with an appropriate MIP, the treated solution and the MIP are separated from each other. The separation step may comprise filtration (e.g., including ultrafiltration), centrifugation, or collection of a liquid or gas sample that has been passed through a chromatographic stationary phase. By "treated sample" is meant a sample comprising less of the target compound than the untreated sample. For example, the method may provide a purified sample comprising about 10% less, about 20% less, about 30% less, about 40% less, about 50% less, about 60% less, about 70% less, about 80% less, about 90% less, about 95% less, or about 98% less of the target compound than the untreated sample.

Although the foregoing description relates primarily to the use of MIPs to isolate and/or remove certain compounds from tobacco or tobacco materials, the present invention also relates to the use of MIPs to remove various compounds from other, non-tobacco-derived materials. For example, MIPs can be used according to the invention to isolate Hoffmann analytes and precursors thereof from any substances known to contain, or expected to contain, such compounds.

In one particular embodiment, MIPs are used to isolate and/or remove various undesirable compounds from liquid smoke. Liquid smoke is a flavoring substance, typically prepared by condensing smoke into a solid and/or liquid and/or by dissolving smoke (or solids and/or liquids produced therefrom) in water. Commercially available liquid smoke products include Colgin's Liquid Smoke, Lazy Kettle Brand Liquid Smoke, Wright's Hickory Seasoning, and Red Arrow natural smoke condensates (e.g., Charsol® products). These and other liquid smoke substances can be prepared using various woods and thus, various liquid smoke products can have somewhat different chemical makeups. Liquid smoke is commonly used to provide desirable flavorful characteristics to tobacco materials such as smokeless tobacco products. According to one aspect of the present invention, MIPs can be tailored to isolate and/or remove Hoffmann analytes or precursors thereof from liquid smoke substances. In certain embodiments, MIPs can be tailored for the removal of BaP from liquid smoke. In certain embodiments, treated liquid smoke is used in smokeless tobacco products to provide desirable flavor with reduced levels of one or more components (e.g., BaP).

In certain embodiments, after binding a target compound with the MIP of the present invention, the MIP-target compound complex can be incorporated within a smokeless tobacco product. In such embodiments, a MIP comprising one or more organoleptic compounds bound thereto is incorporated within a smokeless tobacco product with the intention that the one or more organoleptic compounds are released from the MIP upon use. For example, the MIP can be contained within a pouch designed for use in the oral cavity, wherein the one or more organoleptic compounds may be released from the MIP within the oral cavity.

In certain embodiments, after the target molecule is bound by a MIP, the MIP is treated to remove the target compound from the MIP. The removal of target molecule from a MIP allows for regeneration of the MIP. In some embodiments, removal of the target molecule also provides for possible reuse of the material for the isolation of additional target compound. Removal of target molecules from the MIP is accomplished as noted above for the removal of the template molecule from a MIP. Specifically, in certain embodiments, the target molecule can be removed by washing the material with a suitable solvent and/or heating the material. The means by which the target molecule can be removed is dependent on the nature and strength of the interaction between the imprint sites in the MIP and the target molecule. In certain embodiments, the solvent is selected such that it is capable of breaking the covalent or non-covalent bonds between the target molecule and the imprint sites in the MIP, but does not significantly alter the identity of the target molecule or the identity of the MIP imprint sites. For example, an acidic solvent is avoided where the target molecule is acid-sensitive. Preferably, a solvent is selected such that it removes a high percentage of target molecules from the MIP (e.g., greater than about 70%, greater than about 80%, greater than about 90%, greater than about 95%, greater than about 98%, or greater than about 99% of the bound target molecules from the MIP). In certain embodiments, there is little to no loss of capacity and/or selectivity in the MIP, even after multiple uses.

In embodiments wherein MIPs are used to bind and isolate desirable compounds from tobacco or tobacco materials, the desirable compounds can be removed from the MIPs and concentrated to provide pure samples of the one or more desirable compounds isolated from the tobacco or tobacco materials. By "pure samples" is meant that the samples comprise greater than about 50%, greater than about 60%, greater than about 70%, greater than about 80%, greater than about 90%, greater than about 95%, greater than about 98%, or greater than about 99% by weight of the desirable target compound.

In certain embodiments, flavor compounds that are bound, removed, and isolated from tobacco or tobacco materials by an MIP according to the present invention can be introduced into tobacco materials. The concentrated compounds or mixtures thereof can be employed as a component of a tobacco composition adapted for use in smoking articles in a variety of ways. The compounds can be employed as a component of processed tobaccos. In one regard, the compounds can be employed within a casing formulation for application to tobacco strip or within a top dressing formulation. For exemplary means by which isolates of the invention may be incorporated into casings and applied to tobacco, see, for example, U.S. Pat. No. 3,419,015 to Wochnowski; U.S. Pat. No. 4,054,145 to Berndt et al.; U.S. Pat. No. 4,449,541 to Mays et al.; U.S. Pat. No. 4,819,668 to Shelar et al.; U.S. Pat. No. 4,850,749 to Sweeney; U.S. Pat. No. 4,887,619 to Burcham et al.; U.S. Pat. No. 5,022,416 to Watson; U.S. Pat. No. 5,103,842 to Strang et al.; U.S. Pat. No. 5,383,479 to Winterson et al.; and U.S. Pat. No. 5,711,320 to Martin and UK Patent No. 2,075,375 to Hauni, which are incorporated herein by reference.

In other embodiments, the isolated compounds of the invention can be incorporated into smoking articles as a top dressing ingredient or incorporated into reconstituted tobacco materials (e.g., using the types of tobacco reconstitution processes generally set forth in U.S. Pat. No. 5,143,097 to Sohn; U.S. Pat. No. 5,159,942 to Brinkley et al.; U.S. Pat. No. 5,598,868 to Jakob; U.S. Pat. No. 5,715,844 to Young; U.S. Pat. No. 5,724,998 to Gellatly; and U.S. Pat. No. 6,216,706 to Kumar, which are incorporated herein by reference). Still further, the isolated compounds of the invention can be incorporated into a cigarette filter (e.g., in the filter plug, plug wrap, or tipping paper) or incorporated into cigarette wrapping paper, preferably on the inside surface, during the cigarette manufacturing process.

The isolated compounds of the invention can also be incorporated into aerosol-generating devices that contain tobacco material (or some portion or component thereof) that is not intended to be combusted during use. Exemplary references that describe smoking articles of a type that generate flavored vapor, visible aerosol, or a mixture of flavored vapor and visible aerosol, include U.S. Pat. No. 3,258,015 to Ellis et al.; U.S. Pat. No. 3,356,094 to Ellis et al.; U.S. Pat. No. 3,516,417 to Moses; U.S. Pat. No. 4,347,855 to Lanzellotti et al.; U.S. Pat. No. 4,340,072 to Bolt et al.; U.S. Pat. No. 4,391,285 to Burnett et al.; U.S. Pat. No. 4,917,121 to Riehl et al.; U.S. Pat. No. 4,924,886 to Litzinger; and U.S. Pat. No. 5,060,676 to Hearn et al., all of which are incorporated by reference herein. Many of these types of smoking articles employ a combustible fuel source that is burned to provide an aerosol and/or to heat an aerosol-forming material. See, for example, U.S. Pat. No. 4,756,318 to Clearman et al.; U.S. Pat. No. 4,714,082 to Banerjee et al.; U.S. Pat. No. 4,771,795 to White et al.; U.S. Pat. No. 4,793,365 to Sensabaugh et al.; U.S. Pat. No. 4,917,128 to Clearman et al.; U.S. Pat. No. 4,961,438 to Korte; U.S. Pat. No. 4,966,171 to Serrano et al.; U.S. Pat. No. 4,969,476 to Bale et al.; U.S. Pat. No. 4,991,606 to Serrano et al.; U.S. Pat. No. 5,020,548 to Farrier et al.; U.S. Pat. No. 5,033,483 to Clearman et al.; U.S. Pat. No. 5,040,551 to Schlatter et al.; U.S. Pat. No. 5,050,621 to Creighton et al.; U.S. Pat. No. 5,065,776 to Lawson; U.S. Pat. No. 5,076,296 to Nystrom et al.; U.S. Pat. No. 5,076,297 to Farrier et al.; U.S. Pat. No. 5,099,861 to Clearman et al.; U.S. Pat. No. 5,105,835 to Drewett et al.; U.S. Pat. No. 5,105,837 to Barnes et al.; U.S. Pat. No. 5,115,820 to Hauser et al.; U.S. Pat. No. 5,148,821 to Best et al.; U.S. Pat. No. 5,159,940 to Hayward et al.; U.S. Pat. No. 5,178,167 to Riggs et al.; U.S. Pat. No. 5,183,062 to Clearman et al.; U.S. Pat. No. 5,211,684 to Shannon et al.; U.S. Pat. No. 5,240,014 to Deevi et al.; U.S. Pat. No. 5,240,016 to Nichols et al.; U.S. Pat. No. 5,345,955 to Clearman et al.; U.S. Pat. No. 5,551,451 to Riggs et al.; U.S. Pat. No. 5,595,577 to Bensalem et al.; U.S. Pat. No. 5,819,751 to Barnes et al.; U.S. Pat. No. 6,089,857 to Matsuura et al.; U.S. Pat. No. 6,095,152 to Beven et al; U.S. Pat. No. 6,578,584 to Beven; and U.S. Pat. No. 6,730,832 to Dominguez; which are incorporated herein by reference. Furthermore, certain types of cigarettes that employ carbonaceous fuel elements have been commercially marketed under the brand names "Premier" and "Eclipse" by R. J. Reynolds Tobacco Company. See, for example, those types of cigarettes described in *Chemical and Biological Studies on New Cigarette Prototypes that Heat Instead of Burn Tobacco*, R. J. Reynolds Tobacco Company Monograph (1988) and *Inhalation Toxicology*, 12:5, p. 1-58 (2000). Addition types of aerosol-generating devices are described in U.S. Pat. No. 7,726,320 to Robinson et al. and US Pat. Appl. Pub. Nos. 2006/0196518 and 2007/0267031, both to Hon, all of which are incorporated by reference herein.

The desirable compounds isolated by MIPs as described herein can be incorporated into smokeless tobacco products, such as loose moist snuff, loose dry snuff, chewing tobacco, pelletized tobacco pieces (e.g., having the shapes of pills, tablets, spheres, coins, beads, obloids or beans), extruded or formed tobacco strips, pieces, rods, cylinders or sticks, finely divided ground powders, finely divided or milled agglomerates of powdered pieces and components, flake-like pieces, molded processed tobacco pieces, pieces of tobacco-containing gum, rolls of tape-like films, readily water-dissolvable or water-dispersible films or strips (e.g., US Pat. App. Pub. No. 2006/0198873 to Chan et al.), or capsule-like materials possessing an outer shell (e.g., a pliable or hard outer shell that can be clear, colorless, translucent or highly colored in nature) and an inner region possessing tobacco or tobacco flavor (e.g., a Newtoniam fluid or a thixotropic fluid incorporating tobacco of some form). Various types of smokeless tobacco products are set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,987,907 to Townsend; U.S. Pat. No. 5,092,352 to Sprinkle, III et al.; U.S. Pat. No. 5,387,416 to White et al.; and U.S. Pat. No. 6,834,654 to Williams; US Pat. App. Pub. Nos. 2006/0191548 to Strickland et al.; and 2008/0196730 to Engstrom et al.; PCT WO 04/095959 to Arnarp et al.; PCT WO 05/063060 to Atchley et al.; PCT WO 05/016036 to Bjorkholm; and PCT WO 05/041699 to Quinter et al., each of which is incorporated herein by reference. See also, the types of smokeless tobacco formulations, ingredients, and processing methodologies set forth in U.S. Pat. Nos. 6,953,040 and 7,032,601 to Atchley et al.; U.S. Pat. No. 7,694,686 to Breslin et al.; U.S. Pat. No. 7,810,507 to Dube et al; U.S. Pat. No. 7,819,124 to Strickland et al; and U.S. Pat. No. 7,861,728 to Holton, Jr. et al.; US Pat. Appl. Pub. Nos. 2004/0020503 to Williams, 2006/0191548 to Strickland et al.; 2007/0062549 to Holton, Jr. et al.; 2008/0029116 to Robinson et al.; 2008/0173317 to Robinson et al.; 2008/0209586 to Neilsen et al.; 2010/0018541 to Gerardi et al.; 2010/0018540 to Doolittle et al.; and 2010/0116281 to Marshall et al., each of which is incorporated herein by reference.

The amount of a given desirable compound bound and isolated by a MIP as provided herein that is added to a tobacco composition, or otherwise incorporated within a tobacco composition or tobacco product, can depend on the desired function of that compound, the chemical makeup of that compound, and the type of tobacco composition to which the compound is added. The amount added to a tobacco composition can vary, but will typically not exceed about 5 weight percent based on the total dry weight of the tobacco composition to which the isolated compound is added. The amount added may vary, depending, for example, on the goal to be achieved by addition of such compound or mixture of compounds (e.g., the enhancement of flavor) and on the specific characteristics of the compound or mixture of compounds to be added.

It is important to note, that while specific template compounds are used to form MIPs that are designed to capture specific target compounds, the polymers may have a high affinity for other compounds that are similar to the target compound. A molecularly imprinted polymer may bind a number of compounds that are similar in shape, charge density, geometry, and/or other physical or chemical properties.

EXPERIMENTAL

Aspects of the present invention is more fully illustrated by the following examples, which are set forth to illustrate certain aspects of the present invention and are not to be construed as limiting thereof.

Example 1

Preparation of MIP for Selective Removal of Solanone

Methacrylic acid (3 mol percent), EGDMA (95 mol percent), and 5-isopropyl-8-methylnonan-2-one (2 mol percent) are combined in toluene. 2,2-Azobisisobutyronitrile (AIBN) is added as an initiator. The reaction flask is degassed, purged with dry nitrogen, and sealed. The solution is irradiated with a UV lamp (365 nm) to activate the AIBN and initiate the polymerization reaction.

After 2 hours, the toluene is removed from the reaction mixture and the product is dried in vacuo for 24 hours and ground into fine particles. The particles are treated with methanol in a shaker at room temperature for 12 hours to remove the 5-isopropyl-8-methylnonan-2-one. The MIP is dried overnight at 60° C.

Removal of Solanone

The MIP prepared as described above, is incubated for 2 hours with a methanol extract derived from tobacco, which is expected to contain solanone. After 2 hours, the mixture is centrifuged and the liquid is decanted from the polymer. The liquid is found to contain, for example, over 50% less solanone than prior to treatment with the MIP. The liquid can be discarded or otherwise treated and/or used for other applications.

The MIP is treated with methanol in a shaker at room temperature for 12 hours to remove the solanone, giving a purified solanone solution. The solution is concentrated to give a sample for example, comprising greater than 95% solanone. The MIP is determined to contain only a small amount of bound solanone, and is thus considered to be regenerated and ready for further use in isolating additional solanone.

Example 2

Collection of Benzaldehyde from Headspace of Living Tobacco Flower

A MIP selective for benzaldehyde is prepared in a process according to Example 1, except using benzaldehyde as the template molecule. The resulting MIP is placed in fluid communication with the headspace of living *N. alata* flowers growing in a growth chamber under a 16 hour day and 8 hour night lighting regime.

After allowing contact between the MIP and the flower headspace for 24 hours, the MIP is treated with methanol in a shaker at room temperature for 12 hours to remove the benzaldehyde, giving a purified benzaldehyde solution. The solution is concentrated to give a sample, for example, comprising greater than 95% benzaldehyde. The MIP is determined to contain only a small amount of bound benzaldehyde, and is thus considered to be regenerated and ready for further use in isolating additional benzaldehyde.

Example 3

Removal of B[a]P from Liquid Smoke

A commercially available MIP selective for BaP (Affinilute MIP-PAH from Biotage®) is obtained.

The MIP is brought into contact with Red Arrow Charsol® 6002 liquid smoke product. Specifically, 500 g of the MIP is removed from the cartridge in which it was provided and treated with 10 mL cyclohexane, which is subsequently vacuum filtered off. The 500 g cyclohexane-treated MIP is added to the liquid smoke (10 mL) and the suspension is stirred for approximately two minutes. The MIP is removed by vacuum filtration and the extract is analyzed for BaP content using reverse phase liquid chromatography with fluorescence detection. The amount of BaP in the liquid smoke prior to treatment with the MIP was 1.676 ng/g. Following treatment with the MIP, the amount of BaP is below quantifiable limits.

What is claimed:

1. A molecularly imprinted polymer-selective for 1,3-butadiene or a precursor thereto, wherein the molecularly imprinted polymer comprises a polymer prepared from one or more monomers selected from the group consisting of vinyl-containing monomers, acrylic acid or acrylate-containing monomers, acrylamide-containing monomers, and derivatives thereof, wherein where the monomers are selected from the group consisting of vinyl chloride, vinyl fluoride, vinylidene fluoride, methyl vinyl ether, perfluoro (methyl vinyl ether), chloroprene, isoprene, vinyl acetate, ethylene, acrylic acid, methacrylic acid, trifluoromethacrylic acid, methyl methacrylic acid, methyl methacrylate, ethylene glycol dimethacrylate, hydroxyethylmethacrylate, trans-3-(3-pyridyl)-acrylic acid, styrene, 4-ethyl styrene, p-vinyl benzoic acid, 4-vinylpyridine, 4-vinylbenzyl-trimethyl ammionium chloride, 4(5)-vinyl imidazole, styrene, acrylamide, vinylpyrrolidone, acrylonitrile, 4-vinyl benzamidine, 2-vinylpyridine, 1-vinylimidazole, methacrylamide, acrylamido-(2-methyl)-1-propane sulfonic acid, itaconic acid, and combinations thereof.

* * * * *

UNITED STATES PATENT AND TRADEMARK OFFICE
CERTIFICATE OF CORRECTION

PATENT NO. : 10,617,144 B2
APPLICATION NO. : 14/924394
DATED : April 14, 2020
INVENTOR(S) : Byrd et al.

Page 1 of 1

It is certified that error appears in the above-identified patent and that said Letters Patent is hereby corrected as shown below:

In the Claims

In Claim 1, Column 34, Line 19, the term "where" should be deleted.

Signed and Sealed this
Fifteenth Day of September, 2020

Andrei Iancu
*Director of the United States Patent and Trademark Office*